(12) United States Patent
Pfau (10) Patent No.: US 8,301,037 B2
(45) Date of Patent: Oct. 30, 2012

(54) ITERATIVE CARRIER-PHASE ESTIMATION AND DATA RECOVERY FOR COHERENT OPTICAL RECEIVERS

(75) Inventor: Timo J. Pfau, Westfield, NJ (US)

(73) Assignee: Alcatel Lucent, Paris (FR)

( * ) Notice: Subject to any disclaimer, the term of this patent is extended or adjusted under 35 U.S.C. 154(b) by 417 days.

(21) Appl. No.: 12/718,019

(22) Filed: Mar. 5, 2010

(65) Prior Publication Data

US 2011/0217043 A1 Sep. 8, 2011

(51) Int. Cl.
*H04B 10/06* (2006.01)
(52) U.S. Cl. .................. 398/205; 398/152; 398/208
(58) Field of Classification Search .................. 398/152, 398/205, 208
See application file for complete search history.

(56) References Cited

U.S. PATENT DOCUMENTS

| | | | |
|---|---|---|---|
| 5,049,830 A | 9/1991 | Yoshida | |
| 7,315,575 B2 | 1/2008 | Sun et al. | |
| 7,471,904 B2 | 12/2008 | Kaneda et al. | |
| 7,515,657 B1 | 4/2009 | Lee et al. | |
| 7,606,498 B1 * | 10/2009 | Wu et al. | 398/152 |
| 7,688,918 B2 * | 3/2010 | Koc | 375/329 |
| 7,899,340 B1 * | 3/2011 | Bontu et al. | 398/209 |
| 2010/0002810 A1 | 1/2010 | Li et al. | |
| 2010/0104284 A1 * | 4/2010 | Liu et al. | 398/65 |
| 2010/0232805 A1 * | 9/2010 | Cai | 398/158 |

OTHER PUBLICATIONS

Ezra Ip, et al., "Feedforward Carrier Recovery for Coherent Optical Communications," Journal of Lightwave Technology, vol. 25, No. 9, Sep. 2007, pp. 2675-2692.

Pansoo Kim, et al., "Joint Carrier Recovery and Turbo Decoding Method for TDMA Burst MODEM Under Very Low SNRs," Vehicular Technology Conference, 2006, IEEE 63rd, May 7-10, 2006, vol. 5, pp. 2198-2200.

Hadrien Louchet, et al., "Improved DSP Algorithms for Coherent 16-QAM Transmission," ECOC 2008, Sep. 21-25, 2008, Belgium, vol. 2, pp. 57-58.

Timo Pfau. et al., "Hardware-Efficient Coherent Digital Receiver Concept With Feedforward Carrier Recovery for M-QAM Constellations," Journal of Lightwave Technology, Apr. 15, 2009, vol. 27, No. 8, pp. 989-999.

Suneheui Ryoo, et al., "Efficient Carrier Phase Recovery with Block Turbo Codes," Vehicular Technology Conference, 2005, VTC-2005-Fall. 2005 IEEE 62nd, vol. 3, Issue, Sep. 25-28, 2005, pp. 1417-1420.

Matthias Seimetz, "Laser Linewidth Limitations for Optical Systems with High-Order Modulation Employing Feed Forward Digital Carrier Phase Estimation," Optical Fiber Communication Conference and Exposition and The National Fiber Optic Engineers Conference, OSA Technical Digest (CD) (Optical Society of America, 2008), paper OTuM2. (3 pages).

Alireza Tarighat, et al., "Digital Adaptive Phase Noise Reduction in Coherent Optical Links," Journal of Lightwave Technology, vol. 24, No. 3, Mar. 2006, pp. 1269-1276.

* cited by examiner

*Primary Examiner* — Nathan Curs
(74) *Attorney, Agent, or Firm* — Mendelsohn, Drucker & Associates, P.C.; Yuri Gruzdkov; Steve Mendelsohn (57) ABSTRACT

In one embodiment, a coherent optical receiver has an optical detector coupled to a digital processor. The optical detector mixes a received modulated optical signal with a local-oscillator signal to produce a digital measure of the modulated optical signal. The digital processor processes the digital measure using a primary carrier- and data-recovery (CDR) stage and one or more secondary CDR stages serially connected to one another. The processing performed in each secondary CDR stage is decision-directed and uses the symbol estimate generated by the preceding CDR stage to obtain a respective estimate of the carrier-phase offset and a respective symbol estimate. Since each subsequent CDR stage typically improves the accuracies of its estimates compared to those of the preceding CDR stage(s), the receiver has a lower bit-error rate than a receiver employing a single CDR stage.

20 Claims, 7 Drawing Sheets

ITERATIVE CARRIER-PHASE ESTIMATION AND DATA RECOVERY FOR COHERENT OPTICAL RECEIVERS

BACKGROUND

1. Field of the Invention

The present invention relates to optical communication equipment and, more specifically but not exclusively, to carrier-phase estimation and data recovery for coherent optical receivers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Delivery of multimedia services (e.g., telephony, digital video, and data) that is implemented using optical phase-shift keying (PSK) or quadrature-amplitude modulation (QAM) signals has certain advantages, e.g., over that implemented using conventional electrical analog or digital signals. As a result, cable companies are upgrading their hybrid fiber coaxial networks to improve/create fully interactive, bidirectional optical networks that can carry optical multimedia signals into and out of homes. It is projected that, in the near future, high-definition television signals are likely to be delivered exclusively over optical communication channels.

A typical coherent optical receiver detects the received optical communication signal by mixing it with a local-oscillator (LO) signal and then processing the resulting mixed signals to determine the phase and amplitude of the communication signal in each time slot (symbol period), thereby recovering the encoded data. To enable this phase and amplitude determination, the LO signal may be phase-locked to the carrier frequency (wavelength) of the communication signal using an optical phase-lock loop (PLL). More specifically, the PLL is configured to track the frequency and phase of the communication signal and provide a feedback signal to the LO source, based on which the LO source achieves and maintains the phase lock.

Unfortunately, suitable coherent optical receivers are typically relatively difficult to design and/or relatively expensive to build. For example, a conventional, relatively inexpensive laser source might produce an optical signal that has a relatively large linewidth. If that laser source is used in a coherent optical receiver as a local oscillator, then its relatively large linewidth might produce a phase uncertainty/noise that can make the optical phase-lock between the LO and communication signals difficult to achieve and/or maintain. As a result, coherent optical receivers are often designed to have specially constructed laser sources and/or relatively complex optical PLLs, both of which can drive up the receiver cost by a substantial amount.

SUMMARY

Problems in the prior art are addressed by certain embodiments of a coherent optical receiver adapted to recover data encoded in a received phase-shift-keying (PSK) or quadrature-amplitude modulation (QAM) signal using a local oscillator (LO) signal that does not have to be perfectly phase-locked to the carrier frequency of the received signal. In one embodiment, the coherent optical receiver has an optical detector coupled to a digital processor. The optical detector mixes the received modulated optical signal with the LO signal to produce a digital measure of the modulated optical signal. The digital processor processes the digital measure using a primary carrier- and data-recovery (CDR) stage and one or more secondary CDR stages serially connected to one another. The processing performed in each secondary CDR stage is decision-directed and uses the symbol estimate generated by the preceding CDR stage to obtain a respective estimate of the carrier-phase offset and a respective symbol estimate. Since each subsequent CDR stage typically improves the accuracies of its estimates compared to those of the preceding CDR stage(s), the coherent optical receiver has an advantageously lower bit-error rate (BER) than a receiver employing a single CDR stage.

According to one embodiment, provided is a receiver for a modulated optical signal having (i) a detector adapted to mix the modulated optical signal with a LO signal to produce a digital measure of the modulated optical signal; and (ii) a digital processor being coupled to receive the digital measure and being adapted to process the digital measure to recover data carried by the modulated optical signal. For a symbol period of the modulated optical signal, the digital processor is adapted to derive a digital signal corresponding to the symbol period from the digital measure; generate a first estimate of a carrier-phase offset between the LO signal and a carrier of the modulated optical signal based on the digital signal; generate a first estimate of a symbol carried by the modulated optical signal in said symbol period based on the first estimate of the carrier-phase offset; generate a second estimate of the carrier-phase offset based on the first estimate of the symbol; and generate a second estimate of the symbol based on the second estimate of the carrier-phase offset.

According to another embodiment, provided is a method of processing a modulated optical signal having the steps of (i) mixing the modulated optical signal with a LO signal to produce a digital measure of the modulated optical signal; and (ii) processing the digital measure to recover data carried by the modulated optical signal. For a symbol period of the modulated optical signal, the step of processing comprises deriving a digital signal corresponding to the symbol period from the digital measure; generating a first estimate of a carrier-phase offset between the LO signal and a carrier of the modulated optical signal based on the digital signal; generating a first estimate of a symbol carried by the modulated optical signal in said symbol period based on the first estimate of the carrier-phase offset; generating a second estimate of the carrier-phase offset based on the first estimate of the symbol; and generating a second estimate of the symbol based on the second estimate of the carrier-phase offset.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
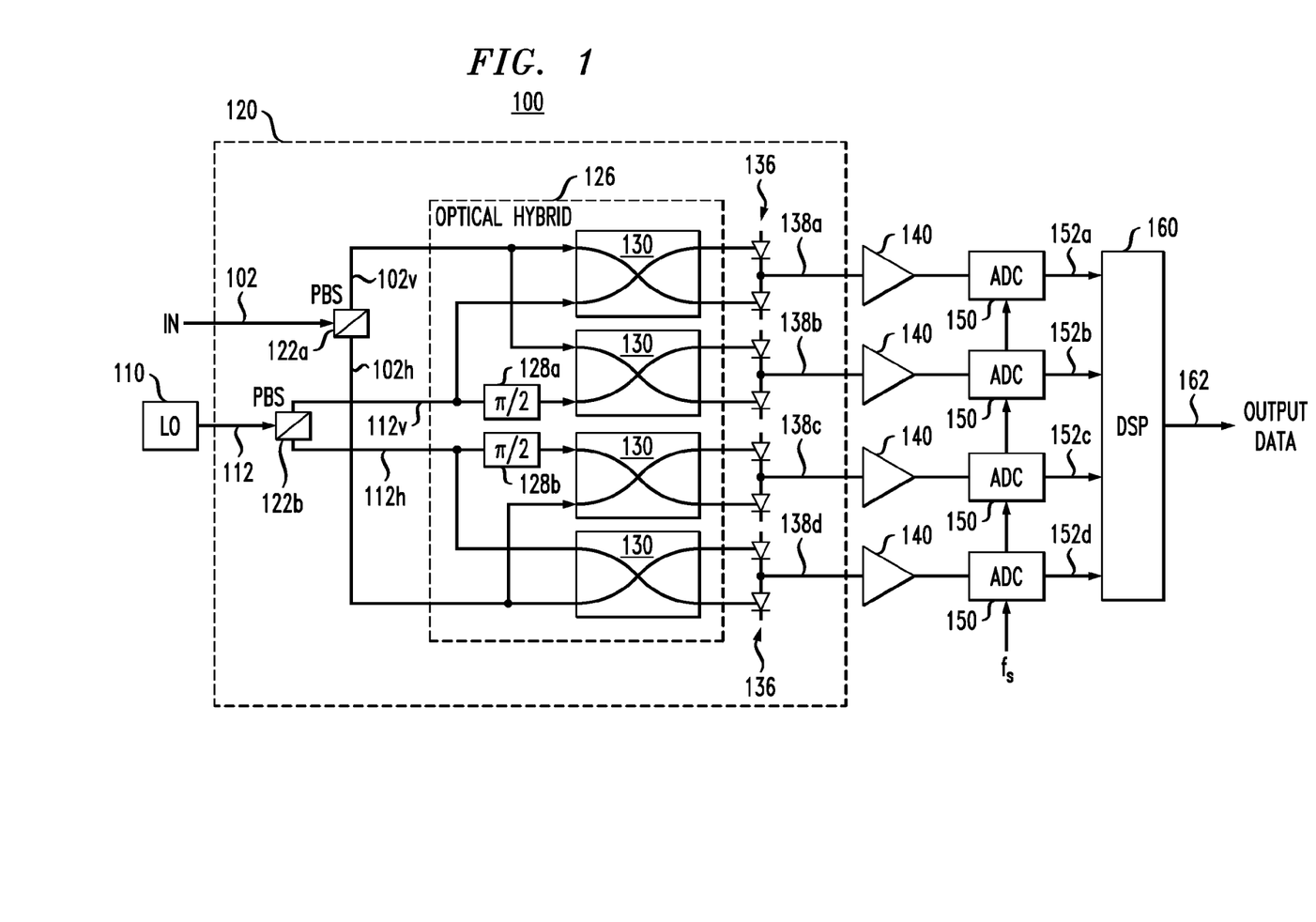
FIG. 1 shows a block diagram of a coherent optical receiver according to one embodiment of the invention.

FIG. 1 shows a block diagram of a coherent optical receiver 100 according to one embodiment of the invention. Receiver 100 receives a polarization-multiplexed optical PSK or QAM signal 102, e.g., from a transmitter via an external optical communication link (not explicitly shown in FIG. 1). Optical signal 102 is applied to an optical-to-electrical (O/E) converter 120 that converts that optical signal into four electrical signals 138*a-d*. Each of electrical signals 138*a-d* is amplified in a corresponding amplifier 140 coupled to a corresponding analog-to-digital converter (ADC) 150. Each ADC 150 samples the output of a corresponding amplifier 140 at sampling frequency $f_s$ to produce a corresponding one of four digital signals 152*a-d*. In a representative configuration, frequency f, can be the same as the signaling rate in signal 102 or an integer multiple of that rate. Digital signals 152*a-d* are applied to a digital signal processor (DSP) 160 that processes them, e.g., as described in more detail below in reference to FIGS. 2-7, to recover the two data streams originally encoded onto two polarization components of optical signal 102 at the transmitter.

O/E converter 120 implements polarization-sensitive intradyne detection using an optical local-oscillator (LO) signal 112 generated by a laser source 110. In one embodiment, O/E converter 120 is an integrated planar waveguide circuit. Polarization beam splitters (PBSs) 122*a-b* decompose signals 102 and 112, respectively, into two respective orthogonally polarized components, illustratively vertically polarized components 102*v* and 112*v* and horizontally polarized components 102*h* and 112*h*. These polarization components are then directed to an optical hybrid 126.

In optical hybrid 126, each of polarization components 102*v*, 112*v*, 102*h*, and 112*h* is split into two (attenuated) copies, e.g., using a conventional 3-dB power splitter (not explicitly shown in FIG. 1). A relative phase shift of about 90 degrees (π/2 radian) is then applied to one copy of component 112*v* and one copy of component 112*h* using phase shifters 128*a-b*, respectively. The various copies of signals 102*v*, 112*v*, 102*h*, and 112*h* are optically mixed with each other as shown in FIG. 1 using four optical signal mixers 130, and the mixed signals produced by the mixers are detected by eight photo-detectors (e.g., photodiodes) 136. Photo-detectors 136 are arranged in pairs, as shown in FIG. 1, and the output of each photo-detector pair is a corresponding one of electrical signals 138*a-d*. In an alternative embodiment, O/E converter 120 can have four photo-detectors 136, one per optical signal mixer 130, configured for single-ended detection of the corresponding optical signals.

One skilled in the art will appreciate that electrical signal 138*a* is a measure of the real part of vertically polarized component 102*v* in the complex plane defined by LO signal 112. Similarly, electrical signal 138*b* is a measure of the imaginary part of vertically polarized component 102*v* in that complex plane; electrical signal 138*c* is a measure of the real part of horizontally polarized component 102*h* in that complex plane; and electrical signal 138*d* is a measure of the imaginary part of horizontally polarized component 102*h* in that complex plane.

Exemplary optical hybrids that are suitable for use in optical receiver 100 are described, e.g., in U.S. Patent Application Publication No. 2007/0297806, which is incorporated herein by reference in its entirety. In various embodiments, optical hybrid 126 can be a bulk optical hybrid or a planar-waveguide optical hybrid. Suitable bulk optical hybrids are commercially available, e.g., from Optoplex Corporation of Fremont, Calif.

Due to a frequency/phase mismatch between LO signal 112 and the optical carrier of input signal 102 and, also, due to the finite spectral width of the LO signal and/or the optical carrier modulated at the optical transmitter and/or the generally present misalignment between the orientation of PBSs 122*a-b* and the orientation of the principal polarization components of the input signal, digital signals 152*a-d* are convoluted signals having contributions corresponding to both of the original polarization-multiplexed optical signals generated by the transmitter. The signal processing performed by DSP 160 substantially de-convolutes digital signals 152*a-d* to recover the two original data streams encoded onto optical signal 102. The recovered data streams are transported out of optical receiver 100 via an output signal 162.

In a representative embodiment, DSP 160 performs (i) signal equalization and (ii) carrier- and data-recovery (CDR) processing. Signal equalization is generally directed at reducing the detrimental effects of various signal impairments imparted onto optical signal 102 in the communication link. Such signal impairments might include, but are not limited to polarization distortion (PD), chromatic dispersion (CD), polarization-mode dispersion (PMD), additive noise, and spectral distortion. One skilled in the art will appreciate that these signal impairments might accrue in the optical communication link through either localized or distributed mechanisms, or through a combination of both types of mechanisms. The CDR processing is generally directed at reducing the detrimental effects of phase noise and/or frequency/phase mismatch between signals 102 and 112.

Figure 2:
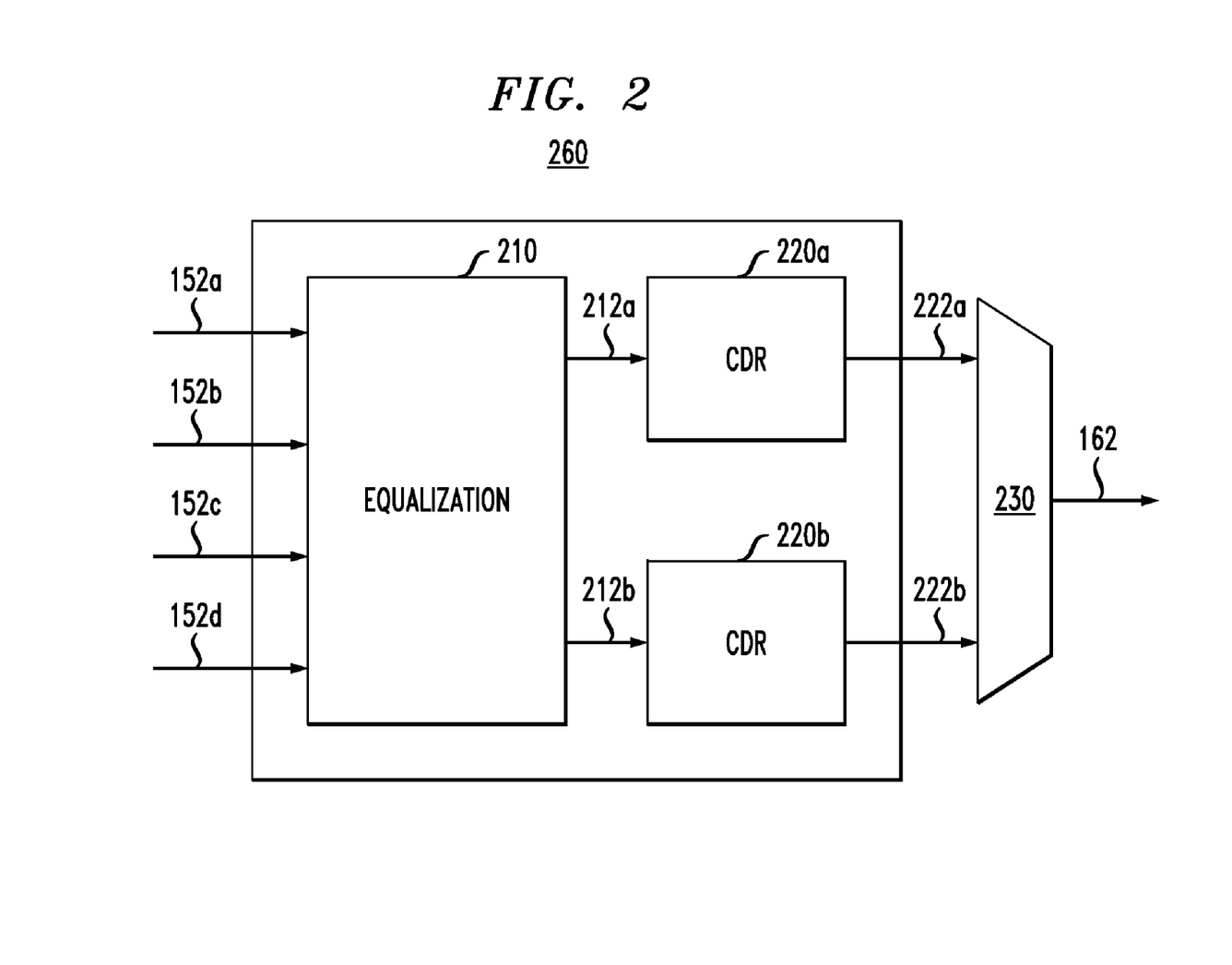
FIG. 2 shows a block diagram of a digital signal processor (DSP) that can be used in the coherent optical receiver of FIG. 1 according to one embodiment of the invention.

FIG. 2 shows a block diagram of a DSP 260 that can be used as DSP 160 according to one embodiment of the invention. DSP 260 has an equalization module 210, to which digital signals 152*a-d* are applied (also see FIG. 1). Equalization module 210 processes digital signals 152*a-d* to generate digital signals 212*a-b*, each of which represents, in digital form, the corresponding one of the two data streams originally encoded at the transmitter onto the two polarization components of optical signal 102. More specifically, equalization module 210 might carry out adaptive polarization tracking and correction that substantially cancels the detrimental effects of polarization distortion in the optical communication link. It is known in the art that polarization distortion typically occurs because different sections of an optical fiber in the communication link have different principal states and/or axes of polarization (PSPs) that are not necessarily aligned with the polarization components of optical signal 102. This misalignment causes each of the polarization components to generally have a non-zero projection on each of the PSPs, which mixes the polarization components and alters the polarization state of optical signal 102 as the signal propagates through the communication link. The PSPs tend to change over time, e.g., due to varying physical conditions in the communication link, which causes the relationship between signal components 102*v-h* to vary over time as well.

In one embodiment, equalization module 210 might also implement techniques directed at reducing or canceling the detrimental effects of chromatic dispersion and/or polarization-mode dispersion. It is known in the art that chromatic dispersion typically occurs because the index of refraction of the fiber core depends on frequency (wavelength), which causes different spectral components of an optical pulse to travel in the fiber at slightly different speeds. As a result, the optical pulse broadens as it propagates along the fiber. Polarization-mode dispersion (PMD) is typically caused by different propagation speeds of two orthogonal polarization modes due to fiber birefringence. Fiber birefringence might be caused, e.g., by deviations in the shape of the fiber core from a perfect cylinder induced by stress, bending, and/or temperature gradients. PMD is frequency-dependent. First-order PMD is a frequency-independent component of (this frequency-dependent) PMD and is responsible for linear inter-symbol interference (ISI) in the electrical domain. Second-order (as well as higher-order) PMD is a frequency-dependent component of PMD and is responsible for optical-pulse broadening similar to that produced by the corresponding order of chromatic dispersion.

In various embodiments, equalization module 210 might implement, as known in the art, one or more equalization techniques suitable for handling one or more of the above-indicated signal impairments. Representative equalization techniques that can be used in equalization module 210 are disclosed, e.g., in U.S. Pat. Nos. 7,315,575 and 7,471,904 and U.S. Patent Application Publication Nos. 2008/0152361, 2008/0152362, and 2008/0152363, all of which are incorporated herein by reference in their entirety.

Digital signals 212a-b produced by equalization module 210 are applied to CDR modules 220a-b, respectively. Digital signal 212 carries complex values and, as such, is a two-component vector signal, wherein the first component is the real part of the corresponding complex value and the second component is the imaginary part of that complex value. Various embodiments of CDR module 220 are described in more detail below in reference to FIGS. 3-7. Briefly, CDR module 220 performs digital processing that corrects or compensates for the changing phase offset between LO signal 112 and the carrier of optical signal 102. The phase-offset correction enables CDR module 220 to appropriately map each symbol relayed by digital signal 212 onto the corresponding QAM or PSK constellation and recover the data originally encoded onto the corresponding polarization component of optical signal 102. The data recovered by CDR modules 220a-b are applied, via signals 222a-b, respectively, to a multiplexer (MUX) 230, where the data are multiplexed to produce output signal 162 (also see FIG. 1). Advantageously, the phase-offset correction performed by CDR module 220 enables optical receiver 100 to tolerate a significant mismatch between the optical frequency of LO signal 112 and the optical carrier frequency of input signal 102.

Figure 3:
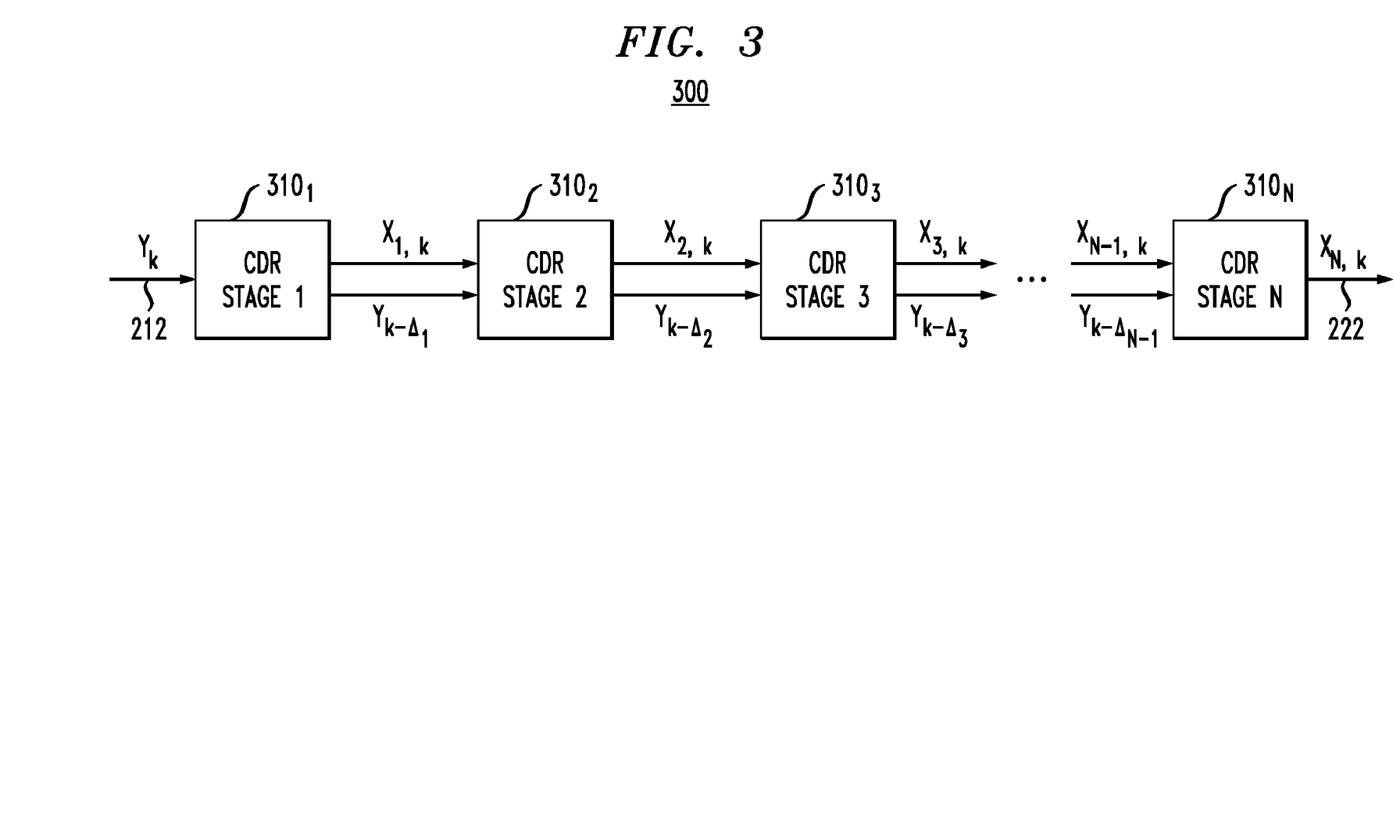
FIG. 3 shows a block diagram of a carrier- and data-recovery (CDR) module that can be used in the DSP of FIG. 2 according to one embodiment of the invention.

FIG. 3 shows a block diagram of a CDR module 300 that can be used as each CDR module 220 of FIG. 2 according to one embodiment of the invention. CDR module 300 has N CDR stages $310_1$-$310_N$ that are serially connected to one another. Although the embodiment of CDR module 300 shown in FIG. 3 has more than three CDR stages 310, in an alternative embodiment, the CDR module can have as few as two or three CDR stages total. Thus, in general, the total number, N, of CDR stages 310 in CDR module 300 can be any positive integer greater than one.

In a representative configuration, CDR module 300 receives digital signal 212 from equalization module 210 and outputs digital signal 222, which is then applied to MUX 230 of FIG. 2. In general, digital signal 212 can be expressed using Eq. (1):

$$Y_k = x_k e^{j\theta_k} + n_k \quad (1)$$

where $Y_k$ represents a stream of complex-valued symbols; k is an index denoting the k-th symbol period; $x_k$ is a complex-valued symbol transmitted by the transmitter in the k-th symbol period; $\theta_k$ is the carrier-phase offset in the k-th symbol period; and $n_k$ is complex-valued noise. The processing performed in each CDR stage 310 of CDR module 300 is directed at (i) making a respective estimate of carrier-phase offset $\theta_k$, (ii) de-rotating symbol $Y_k$ using the carrier-phase-offset estimate, and (iii) generating a respective estimate of symbol $x_k$. The step of obtaining an estimate of carrier-phase offset $\theta_k$ is generally referred to as "carrier recovery." As further explained below, each subsequent CDR stage 310 typically improves the accuracies of its estimates of carrier-phase offset $\theta_k$ and symbol $x_k$ compared to those of the preceding CDR stage(s). As a result, the bit-error rate (BER) in signal 222 is advantageously reduced compared, e.g., to the BER in the output signal of a CDR module having a single CDR stage.

In the description of CDR module 300 and various embodiments of CDR stages 310, the following nomenclature is adhered to: $\phi_{i,k}$ is the estimate of carrier-phase offset $\theta_k$ produced by the i-th CDR stage 310 (i.e., CDR stage $310_i$); $X_{i,k}$ is the estimate of symbol $x_k$ produced by the i-th CDR stage; $\Delta_i$ is the cumulative processing delay in the first i CDR stages expressed using symbol-period units/fractions; and $Y_{k-\Delta_i}$ is symbol $Y_k$ delayed by time $\Delta_i$. Digital signal 222 carries symbols $X_{N,k}$. Cumulative processing delay $\Delta_i$ can be expressed recursively using Eq. (2):

$$\Delta_{i+1} = \Delta_i + \delta_{i+1} \quad (2)$$

where $\delta_{i+1}$ is the processing delay in an individual CDR stage $310_{i+1}$. In a representative embodiment, CDR module 300 is designed so that the value of $\Delta_N$ is smaller than one. In other words, the total symbol-processing time in CDR module 300 is shorter than one symbol period. CDR stage $310_1$ is referred to as a "primary" CDR stage. Each of the subsequent CDR stages $310_q$, where q≠1, is referred to as a "secondary" CDR stage.

In one embodiment, primary CDR stage $310_1$ can be implemented, e.g., using a prior-art single-stage CDR module. In another embodiment, primary CDR stage $310_1$ might employ, for carrier recovery, any suitable decision-directed (DD) carrier-recovery method or a non-DD carrier-recovery method. Two representative embodiments of CDR stage $310_1$ are described below in reference to FIGS. 4 and 5.

One or more secondary CDR stages 310 employ DD carrier-recovery methods. Although the initial estimate ($\phi_{1,k}$) of carrier-phase offset $\theta_k$ produced in primary CDR stage $310_1$ might not be sufficiently accurate, most symbol estimates $X_{i,k}$ will nevertheless correctly represent the corresponding original symbols $x_k$. Secondary CDR stage $310_2$ relies on this property of $X_{1,k}$ to perform carrier recovery again, which generally produces a more-accurate estimate ($\phi_{2,k}$) of carrier-phase offset $\theta_k$. As a result, the output signal of secondary CDR stage $310_2$ that carries symbol estimates $X_{2,k}$ has a lower BER than the BER of the output signal of primary CDR stage $310_1$. Each subsequent secondary CDR stage 310 (if any) is used to further reduce the BER based on the same general principle. In one embodiment, the total number, N, of CDR stages 310 in CDR module 300 is selected by considering a tradeoff between the desired amount of BER reduction and the overall complexity/cost of the corresponding CDR module.

Figure 4:
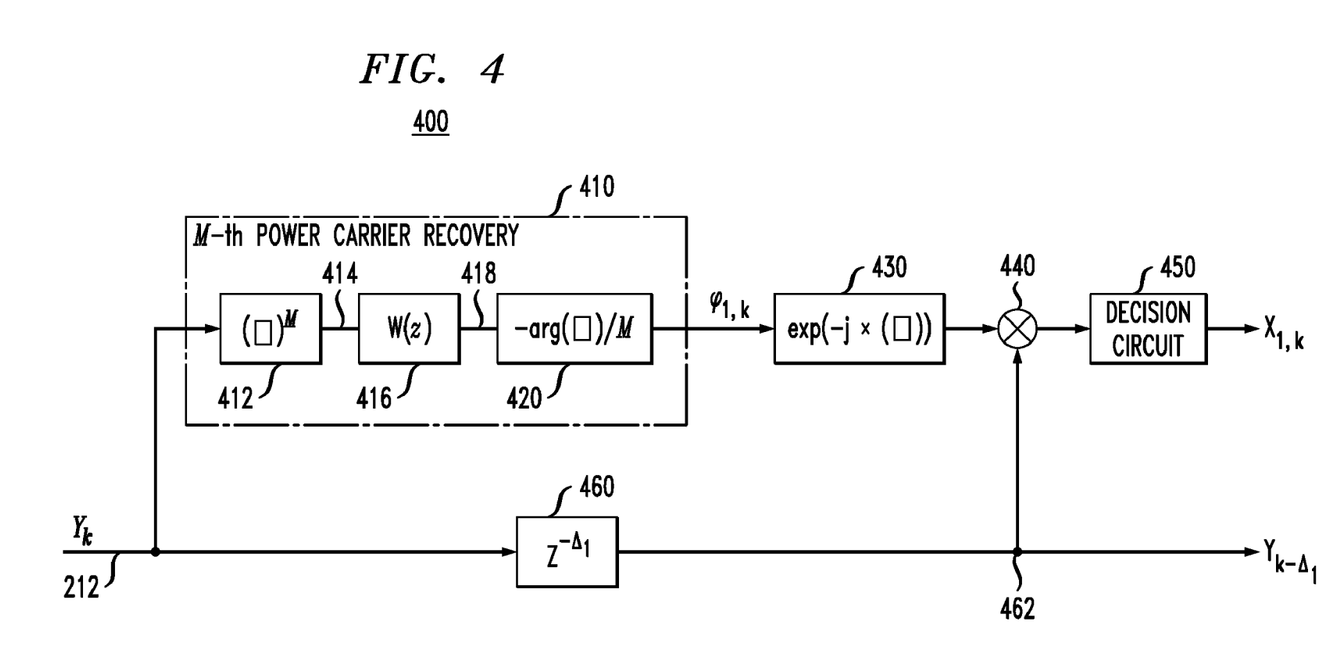
FIG. 4 shows a block diagram of the primary CDR stage for the CDR module of FIG. 3 according to one embodiment of the invention.

FIG. 4 shows a block diagram of a CDR stage 400 that can be used as primary CDR stage 310₁ of FIG. 3 according to one embodiment of the invention. Note that CDR stage 400 uses a pure feedforward approach to carrier recovery and is most suitable for processing PSK signals. As used herein, the term "pure feedforward" refers to a signal-processing arrangement, in which a CDR stage does not receive feedback either from its own output or from any subsequent (downstream) CDR stages. For example, CDR stage 400 has a carrier-recovery circuit 410 that implements an M-th-power carrier-recovery method. Carrier-recovery circuit 410 makes use of the M-fold rotational symmetry of an M-PSK constellation, which symmetry is evident from Eq. (3):

$$S_m = A_0 e^{j\frac{2\pi}{M}m} \quad (3)$$

where $S_m$ is the m-th symbol of the M-PSK constellation; $A_0$ is the constant amplitude; and m is zero or a positive integer smaller than M.

An M-th-power circuit 412 of carrier-recovery circuit 410 generates a digital signal 414 by taking the M-th power of each symbol $Y_k$ carried by digital signal 212. By combining Eqs. (1) and (3), digital signal 414 can be expressed as follows:

$$(Y_k)^M \gamma A_0^M e^{jM\Theta_k} + r_k \quad (4)$$

where $r_k$ is the unwanted residual that represents a sum of various cross terms between symbol $x_k$ and noise $n_k$. Note that circuit 412 makes digital signal 414 substantially free of M-PSK phase modulation because, for any M-PSK symbol $S_m$, the M-th-power operation causes the phase of the symbol to become an integer multiple of $2\pi$ (see Eq. (3)).

Circuit 412 applies digital signal 414 to a finite-impulse-response (FIR) filter 416, which produces a filtered digital signal 418. FIR filter 416 is a relatively narrow-band filter that helps to reduce the phase-slip rate and improve the carrier-to-noise power ratio by at least partially filtering out the contribution of unwanted residual $r_k$. In one embodiment, FIR filter 416 can be one of the transversal filters disclosed, e.g., in U.S. Pat. Nos. 5,666,339, 5,596,605, and 6,870,880, all of which are incorporated herein by reference in their entirety.

FIR filter 416 applies digital signal 418 to a phase-offset-estimate (POE) calculator 420, which is configured to output a stream of estimates $\phi_{1,k}$. More specifically, in each symbol period, POE calculator 420 calculates the corresponding estimate $\phi_{1,k}$ by determining the argument of the complex value supplied by digital signal 418 and then dividing the determined argument by M. Note that estimate $\phi_{1,k}$ typically deviates from carrier-phase offset $\theta_k$ due to the non-zero contribution into digital signal 418 of filtered residual $r_k$ (see Eq. (4)).

Carrier-recovery circuit 410 applies estimate $\phi_{1,k}$ to an exponential-transform circuit 430 that calculates a complex exponential of $\phi_{1,k}$. The calculated exponential and a delayed copy of symbol $Y_k$ are then multiplied in a multiplier 440. The effect of the multiplication is to de-rotate symbol $Y_k$ by phase-offset estimate $\phi_{1,k}$. The de-rotated symbol produced by multiplier 440 is then mapped onto the M-PSK constellation and sliced in a conventional manner in a decision circuit 450 to generate symbol estimate $X_{1,k}$.

Note that, in the embodiment shown in FIG. 4, most of the processing delay in CDR stage 400 occurs in carrier-recovery circuit 410 and exponential-transform circuit 430. As a result, a single delay element 460 is used in CDR stage 400 to align symbol $Y_k$ and the exponential of $\phi_{1,k}$ in time for their proper multiplication in multiplier 440. In an alternative embodiment, in which decision circuit 450 has a sizeable processing delay, an additional delay element similar to delay element 460 can be incorporated downstream from a junction 462 to properly align in time, at the output of CDR stage 400, symbol $Y_{k-\Delta_1}$ and symbol estimate $X_{1,k}$.

Figure 5A:
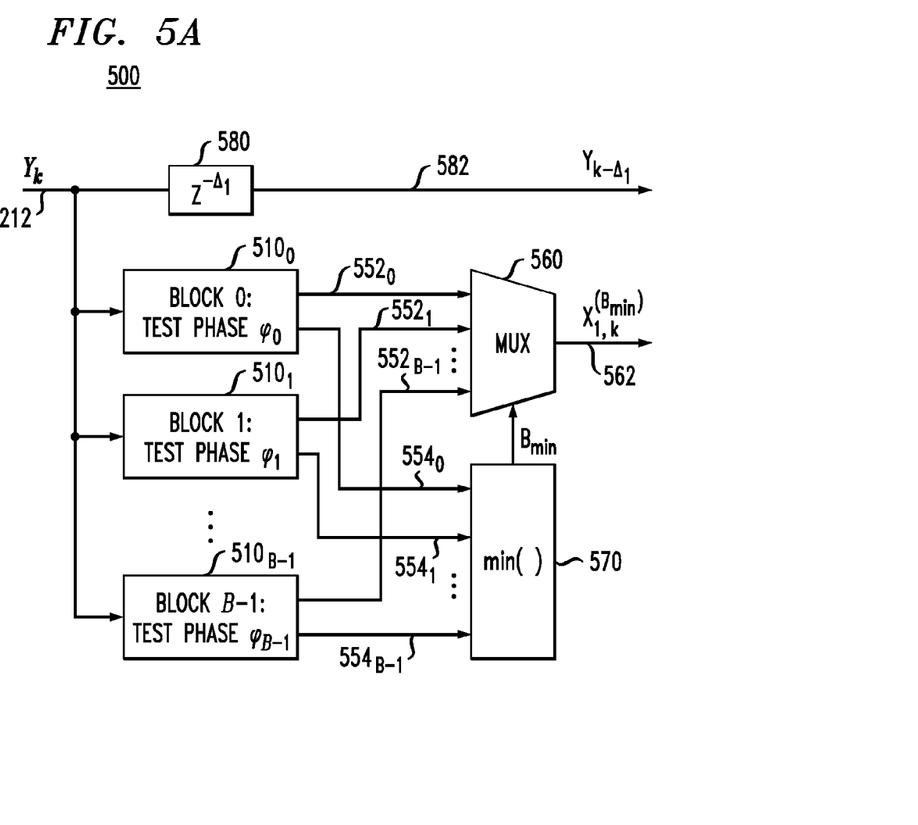
FIGS. 5A and 5B show a block diagram of the primary CDR stage for the CDR module of FIG. 3 according to another embodiment of the invention.
Figure 5B:
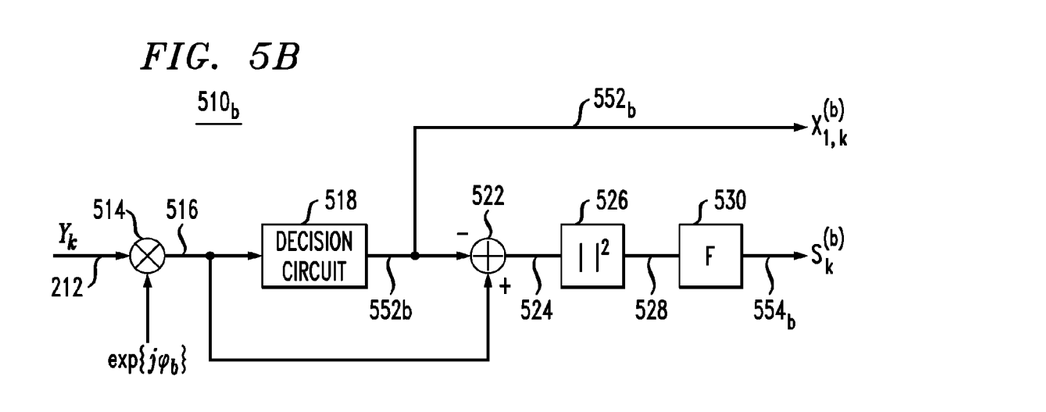

FIGS. 5A-B show block diagrams of a CDR stage 500 that can be used as primary CDR stage 310₁ of FIG. 3 according to another embodiment of the invention. More specifically, FIG. 5A shows the overall schematics of CDR stage 500. FIG. 5B shows a block diagram of a test-phase module 510, a plurality of which are used in CDR stage 500. Note that CDR stage 500 uses a pure feedforward approach to carrier recovery and is most suitable for processing QAM signals.

Referring to FIG. 5A, CDR stage 500 has B test-phase modules 510, which are labeled 510₀-510_{B-1}, where B is an integer greater than 1. In general, the choice of B depends on the size of the QAM constellation, with larger B numbers corresponding to larger constellations. Each test-phase module 510 receives, as an input, a copy of digital signal 212 and processes that signal as further described below in reference to FIG. 5B. Based on the processing performed therein, test-phase module $510_b$ (where b∈{0,1,...,B-1}) generates two output signals labeled $552_b$ and $554_b$. Output signal $552_b$ carries a trial value of symbol estimate $X_{1,k}$, which is designated $X_{1,k}^{(b)}$. Output signal $554_b$ carries a measure of the deviation of trial value $X_{1,k}^{(b)}$ from the most-probable value of symbol estimate $X_{1,k}$, which measure is designated $s_k^{(b)}$.

Signals $552_0$-$552_{B-1}$ generated by test-phase modules $510_0$-$510_{B-1}$, respectively, are applied to a MUX 560. Similarly, signals $554_0$-$554_{B-1}$ are applied to a MUX-control module 570. In each symbol period, MUX-control module 570 sorts measures $s_k^{(b)}$ and determines $b_{min}$ corresponding to the smallest one of them. Eq. (5) provides an expression for $b_{min}$ in mathematical terms:

$$s_k^{(b_{min})} = \min_{0 \le b \le B-1} s_k^{(b)} \quad (5)$$

MUX-control module 570 then configures MUX 560 to select its $b_{min}$-th input signal and output it as an output signal 562. In mathematical terms, symbol estimate $X_{1,k}$ produced by CDR stage 500 is expressed as follows:

$$X_{1,k} = X_{1,k}^{(b_{min})} \quad (6)$$

CDR stage 500 uses a delay element 580 to delay digital signal 212, thereby producing delayed symbol $Y_{k-\Delta_1}$ on an output line 582. The delay time $\Delta_1$ applied by delay element 580 to each symbol $Y_k$ reflects the processing time in CDR stage 500 for producing symbol estimate $X_{1,k}$ on output line 562. As a result, symbol $Y_{k-\Delta_1}$ and symbol estimate $X_{1,k}$ produced by CDR stage 500 become appropriately aligned in time.

Referring to FIG. 5B, test-phase module $510_b$ has a multiplier 514 that rotates symbol $Y_k$ by test phase $\phi_b$ to generate a digital signal 516. Different test-phase modules 510 use different test phases, which are calculated according to Eq. (7):

$$\varphi_b = \frac{b}{B}\frac{\pi}{2} \quad (7)$$

The rotated symbol carried by signal 516 is applied to a decision circuit 518, which generates digital signal $552_b$ carrying trial symbols $X_{1,k}^{(b)}$. An adder 522 subtracts digital signal $552_b$ from digital signal 516 to generate a digital signal 524 that carries a complex value corresponding to the distance, in the complex plane, between the rotated symbol carried by signal 516 and the nearest QAM constellation point. A distance calculator 526 that receives digital signal 524 multiplies the received complex value by its complex conjugate, thereby calculating the square of the distance.

The squared distances calculated by distance calculator 526 are applied, via a digital signal 528, to a digital filter 530, which generates digital signal $554_b$. More specifically, digital filter 530 filters digital signal 528 to remove noise distortions and generate measures $s_k^{(b)}$ In one embodiment, digital filter 530 generates the next $s_k^{(b)}$ value by summing up a selected number of consecutive, squared distances received from distance calculator 526. Additional implementation details for CRD module 500 and test-phase module 510 can be found, e.g., in an article by T. Pfau, et al., entitled "Hardware-Efficient Coherent Digital Receiver Concept with Feedforward Carrier Recovery for M-QAM Constellations," published in J. Lightwave Tech, 2009, v. 27, pp. 989-999, which is incorporated herein by reference in its entirety.

To summarize, CDR stage 500 obtains estimate $\phi_{1,k}$ by (i) evaluating a plurality of different test phases and (ii) selecting from said plurality a test phase that provides a maximum likelihood for the corresponding trial symbol $X_{1,k}^{(b)}$ to correctly represent symbol $x_k$. In various embodiments, the test phases for the evaluation can be generated using any suitable method, which might be different from that expressed by Eq. (7). Similarly, the determination of the maximum likelihood can be based on any suitable measure that estimates the deviation of trial symbol $X_{1,k}^{(b)}$ from the actual symbol $x_k$, which measure might be different from measure $s_k^{(b)}$ described above in the context of to FIG. 5B.

Figure 6:
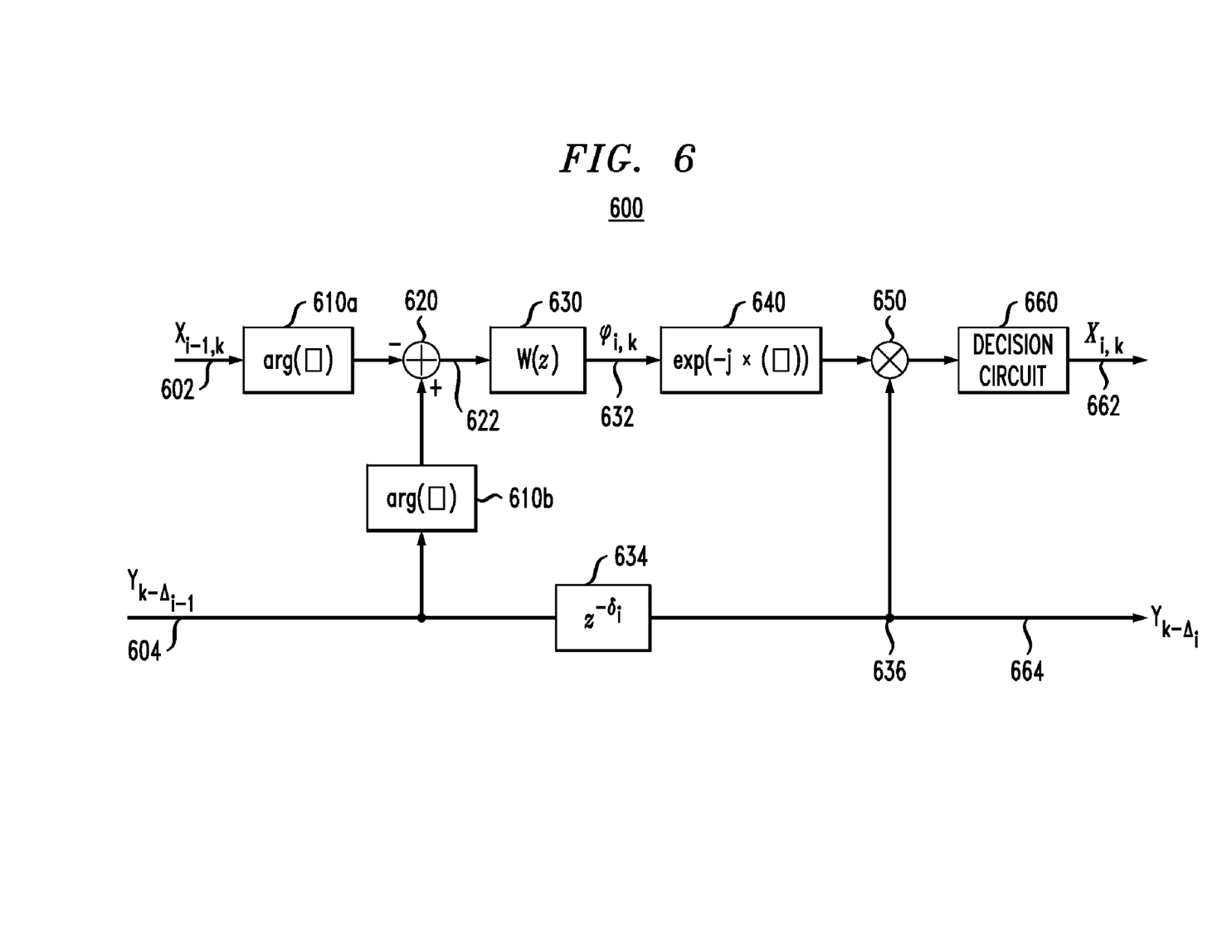
FIG. 6 shows a block diagram of a secondary CDR stage for the CDR module of FIG. 3 according to one embodiment of the invention.

FIG. 6 shows a block diagram of a CDR stage 600 that can be used as a secondary CDR stage $310_i$ of FIG. 3 (where i>1) according to one embodiment of the invention. CDR stage 600 implements a decision-directed (DD) carrier-recovery method and is suitable for processing both PSK and QAM signals. As such, CDR stage 600 can be used in embodiments of CDR module 300 employing either primary CDR stage 400 (FIG. 4) or primary CDR stage 500 (FIG. 5). CDR stage 600 receives input signals 602 and 604 from the immediately preceding primary or secondary CDR stage. Input signal 602 carries symbol estimates Input signal 604 carries symbols $Y_{k-\Delta_{i-1}}$. CDR stage 600 processes input signals 602 and 604 as described below to generate output signals 662 and 664. Output signal 662 carries symbol estimates $X_{i,k}$. Output signal 664 carries symbols $Y_{k-\Delta_i}$.

Input signal 602 is applied to a phase calculator 610a that determines the phase of that signal by calculating the argument, in the complex plane, of the complex-valued symbol estimate $X_{i-1,k}$. Similarly, input signal 604 is applied to a phase calculator 610b that determines the phase of that signal by calculating the argument of the complex-valued symbol $Y_k$. The determined phases are applied to an adder 620, which is configured to calculate a phase difference and apply the result of the calculation, via a digital signal 622, to an FIR filter 630. In one embodiment, FIR filter 630 might be similar to FIR filter 416 (FIG. 4).

FIR filter 630 digitally filters signal 622 to produce a filtered phase difference, which represents phase-offset estimate $\phi_{i,k}$ made by CDR stage 600. The filtered phase difference is applied, via a digital signal 632, to an exponential-transform circuit 640. Exponential-transform circuit 640 is designed to calculate a complex exponential of its input signal and, as such, produces an exponential of the filtered phase difference. The exponential of the filtered phase difference and a delayed copy of symbol $Y_k$ are then multiplied in a multiplier 650. The effect of the multiplication is to de-rotate symbol $Y_k$ by the filtered phase difference. The de-rotated symbol produced by multiplier 650 is then mapped onto the corresponding PSK or QAM constellation and sliced in a conventional manner in a decision circuit 660 to generate symbol estimate $X_{i,k}$ for output signal 662.

Note that, in the embodiment shown in FIG. 6, most of the processing delay in CDR stage 600 occurs in circuits 610-640. As a result, a single delay element 634 is used in CDR stage 600 to align symbol $Y_k$ and the exponential of the phase difference in time for their proper multiplication in multiplier 650. In an alternative embodiment, in which decision circuit 660 has a sizeable processing delay, an additional delay element similar to delay element 634 can be incorporated downstream from a junction 636 to properly align in time, at the output of CDR stage 600, symbol $Y_{k-\Delta_i}$ and symbol estimate $X_{i,k}$.

Figure 7:
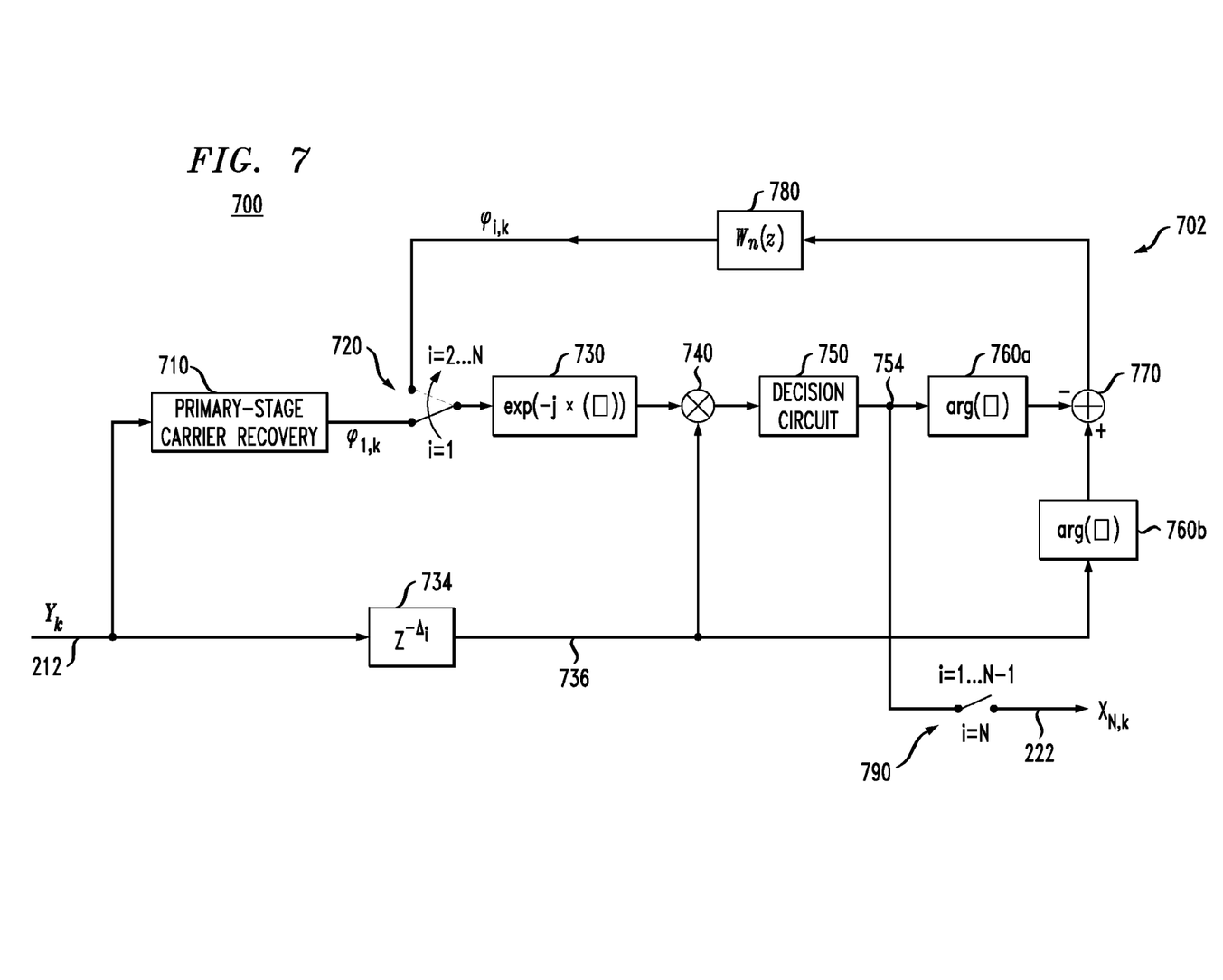
FIG. 7 shows a block diagram of a CDR module that can be used in the DSP of FIG. 2 according to another embodiment of the invention.

FIG. 7 shows a block diagram of a CDR module 700 that can be used as CDR module 220 of FIG. 2 according to another embodiment of the invention. In terms of the signal-processing flow, CDR module 700 is analogous to CDR module 300 (FIG. 3). However, unlike CDR stages 310, which are implemented as separate non-overlapping hardware modules, different CDR stages in CDR module 700 are implemented so that at least some of them share various circuit elements, as further explained below.

CDR module 700 has a primary-stage carrier-recovery circuit 710 that generates the initial estimate, $\phi_{1,k}$, of the carrier-phase offset. In one embodiment, circuit 710 can be similar to carrier-recovery circuit 410 (FIG. 4). In another embodiment, circuit 710 can be implemented using some of the circuitry of primary CDR stage 500 (FIG. 5) and generate the initial estimate of the carrier-phase offset so that $\phi_{1,k} = \phi_{b_{min}}$ (see Eqs. (5) and (7)).

The output of carrier-recovery circuit 710 is coupled to an exponential-transform circuit 730 via a switch 720 having two possible configurations. In the first configuration of switch 720, the output of carrier-recovery circuit 710 is electrically connected to the input of exponential-transform circuit 730. In the second configuration of switch 720, the output of carrier-recovery circuit 710 is electrically disconnected from the input of exponential-transform circuit 730, with said input being electrically connected to the output of a digital filter 780. During each symbol period, switch 720 is typically controlled so that it switches from the first configuration to the second configuration and then back only one time. For example, switch 720 might switch from the first configuration to the second configuration after the value of phase-offset estimate $\phi_{1,k}$ generated by carrier-recovery circuit 710 has latched onto the input register of exponential-transform circuit 730. Switch 720 might switch from the second configuration back to the first configuration after the value of symbol estimate $X_{N,k}$ produced by a decision circuit 750 has been applied to output line 222.

When switch 720 is in the second configuration, exponential-transform circuit 730, a multiplier 740, decision circuit 750, a phase calculator 760a, an adder 770, and digital filter 780 form a circular loop 702. If CDR module 700 is configured to implement N CDR stages (also see FIG. 3), then a digital signal is cycled N-1 times through circular loop 702, with one full cycle defined as a roundtrip of the corresponding digital signal from a junction 754, through circular loop 702, and back to junction 754. Junction 754 is coupled to output line 222 via a switch 790 that can be in either an open (non-conducting) state or a closed (conducting) state. CDR module 700 controls switch 790 to be kept in an open state while the digital signal is being cycled through circular loop 702. However, as soon as decision circuit 750 has produced symbol estimate $X_{N,k}$, after the (N-1)-th cycle, at junction 754, CDR module 700 directs switch 790 to transition into a closed state, thereby applying the symbol estimate to output line 222.

To properly align in time the digital signals that are being applied to multiplier 740 and adder 770 during the different processing cycles of circular loop 702, CDR module 700 employs a configurable delay circuit 734. For example, in one embodiment, delay circuit 734 might have a plurality of different delay lines, each receiving, as an input signal, a copy of digital signal 212. During the different processing cycles of circular loop 702, delay circuit 734 selects a different one of these delay lines and connects it to an output line 736, thereby providing proper time alignment for the input digital signals applied to multiplier 740 and adder 770.

Each processing cycle of circular loop 702, from junction 754 to junction 754, has a processing flow that is generally similar to that of CDR stage 600 (FIG. 6). Thus, for an embodiment corresponding to N>2, CDR module 700 implements two or more secondary CDR stages using the following circuit elements: exponential-transform circuit 730, multiplier 740, decision circuit 750, phase calculators 760a-b, and digital filter 780. In effect, these elements are shared by the secondary CDR stages. Furthermore, a comparison of FIGS. 4 and 7 reveals that, when switch 720 is in the first configuration, CDR module 700 implements a primary CDR stage using carrier-recovery circuit 710, exponential-transform circuit 730, multiplier 740, and decision circuit 750. This means that the primary CDR stage and at least one secondary CDR stage in CDR module 700 share exponential-transform circuit 730, multiplier 740, and decision circuit 750.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

What is claimed is:

1. A receiver for an optical signal modulated by symbols over a sequence of symbol periods, comprising:
    a detector adapted to mix the modulated optical signal with a local-oscillator (LO) signal to produce a digital measure of the modulated optical signal for the sequence; and
    a digital processor being coupled to receive the digital measure and being adapted to process the digital measure to recover data carried by the modulated optical signal, wherein, for each one of the symbol periods from the sequence, the digital processor is adapted to:
    derive a digital signal corresponding to the one of the symbol periods from the digital measure;
    generate a first estimate of a carrier-phase offset between the LO signal and a carrier of the modulated optical signal based on the digital signal;
    generate a first estimate of the symbol carried by the modulated optical signal in said one of the symbol periods based on the first estimate of the carrier-phase offset;
    generate a second estimate of the carrier-phase offset based on the first estimate of the symbol; and
    generate a second estimate of the symbol carried by the modulated optical signal in said one of the symbol periods based on the second estimate of the carrier-phase offset.

2. The invention of claim 1, wherein:
    the second estimate of the carrier-phase offset is generated based on the digital signal and the first estimate of the symbol; and
    the data carried by the modulated optical signal in said one of the symbol periods is recovered based on the second estimate of the symbol.

3. The invention of claim 1, wherein, for the one of the symbol periods, the digital processor is further adapted to:
generate a third estimate of the carrier-phase offset based on the second estimate of the symbol; and
generate a third estimate of the symbol carried by the modulated optical signal in said one of the symbol periods based on the third estimate of the carrier-phase offset, wherein the data carried by the modulated optical signal in said one of the symbol periods is recovered based on the third estimate of the symbol.

4. The invention of claim 1, wherein the digital processor is adapted to generate both the first estimate of the carrier-phase offset and the second estimate of the carrier-phase offset within a time interval that is shorter than one of the symbol periods.

5. The invention of claim 1, wherein the digital processor is adapted to generate both the first estimate of the symbol and the second estimate of the symbol within a time interval that is shorter than one of the symbol periods.

6. The invention of claim 1, wherein the digital processor comprises:
a primary carrier- and data-recovery (CDR) stage adapted to generate the first estimate of the carrier-phase offset and the first estimate of the symbol; and
a secondary CDR stage coupled to the primary CDR stage and adapted to generate the second estimate of the carrier-phase offset and the second estimate of the symbol.

7. The invention of claim 6, wherein:
the digital processor further comprises one or more subsequent secondary CDR stages serially coupled to one another and the preceding secondary CDR stage; and
each subsequent secondary CDR stage is coupled to a preceding secondary CDR stage to receive (i) a respective estimate of the symbol generated by the preceding secondary CDR stage and (ii) a respective delayed copy of the digital signal.

8. The invention of claim 7, wherein each subsequent secondary CDR stage is adapted to:
generate a respective estimate of the carrier-phase offset based on the estimate of the symbol received from the preceding secondary CDR stage; and
generate a respective estimate of the symbol carried by the modulated optical signal in said one of the symbol periods based on (i) the generated estimate of the carrier-phase offset and (ii) the respective delayed copy of the digital signal.

9. The invention of claim 7, wherein a delay time for the respective delayed copy is shorter than one of the symbol periods.

10. The invention of claim 6, wherein the primary CDR stage performs feedforward processing to make the first estimate of the carrier-phase offset.

11. The invention of claim 1, wherein the digital processor generates the first estimate of the carrier-phase offset by generating an M-th power of the digital signal, where M is a size of a constellation corresponding to the modulated optical signal.

12. The invention of claim 1, wherein the digital processor generates the first estimate of the carrier-phase offset by evaluating a plurality of different test phases and selecting from said plurality the one of the test phases that provides a maximum likelihood that the corresponding estimate of the symbol correctly represents the symbol carried by the modulated optical signal in said one of the symbol periods.

13. The invention of claim 1, wherein the digital processor comprises:
a carrier-recovery circuit adapted to receive the digital signal and generate the first estimate of the carrier-phase offset; and
a loop circuit coupled to the carrier-recovery circuit through a first switch and adapted to process the digital signal and a previous estimate of the symbol carried by the modulated optical signal in said one of the symbol periods to generate a next estimate of the carrier-phase offset and a next estimate of the symbol carried by the modulated optical signal in said one of the symbol periods.

14. The invention of claim 13, wherein:
in a first configuration of the first switch, the loop circuit receives the first estimate of the carrier-phase offset from the carrier-recovery circuit and generates the first estimate of the symbol carried by the modulated optical signal in said one of the symbol periods; and
in a second configuration of the first switch, the loop circuit operates to generate a next estimate of the carrier-phase offset and a next estimate of the symbol carried by the modulated optical signal in said one of the symbol periods.

15. The invention of claim 14, wherein the first switch is configured to switch from the first configuration to the second configuration and then back only one time during one of the symbol periods.

16. The invention of claim 13, wherein the loop circuit comprises a decision circuit that generates the first estimate of the symbol carried by the modulated optical signal in said one of the symbol periods, the second estimate of the symbol carried by the modulated optical signal in said one of the symbol periods, and, optionally, one or more additional estimates of the symbol carried by the modulated optical signal in said one of the symbol periods.

17. The invention of claim 16, wherein the digital processor further comprises a second switch that couples an output of the decision circuit to an output line of the digital processor, wherein:
the decision circuit is configured to serially generate N different estimates of each of the symbols from the sequence, where N is an integer greater than one; and
the digital processor configures the second switch to (i) be in an open state, when the decision circuit generates the initial (N-1) of the N estimates, and (ii) transition into a closed state to cause the decision circuit to apply the N-th estimate to the output line.

18. The invention of claim 1, wherein:
the modulated optical signal is a polarization-multiplexed optical signal; and
the digital processor comprises:
an equalization module coupled to the detector to receive the digital measure; and
at least a first CDR module coupled to the equalization module, wherein:
the equalization module is adapted to process the digital measure to generate the digital signal so that the digital signal corresponds to a selected single polarization component of the modulated optical signal; and
the first CDR module is adapted to receive the digital signal from the equalization module to generate the first and second estimates of the carrier-phase offset and generate the first and second estimates of the symbol carried by the modulated optical signal in said one of the symbol periods.

19. A method of processing an optical signal modulated by symbols over a sequence of symbol periods, the method comprising:

mixing the modulated optical signal with a local-oscillator (LO) signal to produce a digital measure of the modulated optical signal for the sequence; and processing the digital measure to recover data carried by the modulated optical signal, wherein, for each one of the symbol periods from the sequence, said processing comprises:

deriving a digital signal corresponding to the one of the symbol periods from the digital measure;

generating a first estimate of a carrier-phase offset between the LO signal and a carrier of the modulated optical signal based on the digital signal;

generating a first estimate of the symbol carried by the modulated optical signal in said one of the symbol periods based on the first estimate of the carrier-phase offset;

generating a second estimate of the carrier-phase offset based on the first estimate of the symbol; and generating a second estimate of the symbol carried by the modulated optical signal in said one of the symbol periods based on the second estimate of the carrier-phase offset.

20. The invention of claim 19, wherein, for the one of the symbol periods, said processing further comprises:

generating a third estimate of the carrier-phase offset based on the second estimate of the symbol carried by the modulated optical signal in said one of the symbol periods; and generating a third estimate of the symbol carried by the modulated optical signal in said one of the symbol periods based on the third estimate of the carrier-phase offset, wherein the data carried by the modulated optical signal in said symbol period are recovered based on the third estimate of the symbol.

\* \* \* \* \*